United States Patent
Rake et al.

(10) Patent No.: US 9,777,813 B2
(45) Date of Patent: Oct. 3, 2017

(54) DEVICE AND METHOD FOR SELECTING A SWITCH POSITION

(71) Applicant: ZF Friedrichshafen AG, Friedrichshafen (DE)

(72) Inventors: Ludger Rake, Steinfeld (DE); Sascha Rosentreter, Espelkamp (DE); Andreas Giefer, Lemfoerde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 373 days.

(21) Appl. No.: 14/439,294

(22) PCT Filed: Oct. 1, 2013

(86) PCT No.: PCT/EP2013/070387
§ 371 (c)(1),
(2) Date: Apr. 29, 2015

(87) PCT Pub. No.: WO2014/067733
PCT Pub. Date: May 8, 2014

(65) Prior Publication Data
US 2015/0285351 A1    Oct. 8, 2015

(30) Foreign Application Priority Data
Oct. 30, 2012 (DE) .................. 10 2012 219 803

(51) Int. Cl.
*F16H 27/06* (2006.01)
*F16H 59/08* (2006.01)
(Continued)

(52) U.S. Cl.
CPC ............ *F16H 27/06* (2013.01); *F16H 59/08* (2013.01); *G05G 1/08* (2013.01);
(Continued)

(58) Field of Classification Search
CPC .... F16H 27/06; F16H 59/08; F16H 2059/081; G05G 1/08
See application file for complete search history.

(56) References Cited

U.S. PATENT DOCUMENTS 1,932,141 A * 10/1933 Miller ................. F16H 27/06
74/436
2,392,320 A * 1/1946 Hegy .................. G05D 3/127
318/15

(Continued)

FOREIGN PATENT DOCUMENTS

DE    10 2004 049011 A1    4/2006
WO       02/18882 A1    3/2002

OTHER PUBLICATIONS

International Search Report dated Nov. 29, 2013 in International Application No. PCT/EP2013/070387 (English language).
(Continued)

*Primary Examiner* — Terence Boes
(74) *Attorney, Agent, or Firm* — Brinks Gilson & Lione

(57) ABSTRACT

The present disclosure provides a device for selecting a desired switch position out of a plurality of switch positions, and a switch position depends on a position of at least one locking bolt relative to a snap-in cam, with a support member for a control element. The support member is arranged below a user interface and rotatable around a shaft relative to the locking bolt. The snap-in cam is designed in the support member, and a Maltese cross transmission structure is formed in the support member. A drive device is in engagement with the Maltese cross transmission structure so as to rotate the support member with the snap-in cam around the shaft relative to the locking bolt depending on the desired switch position.

20 Claims, 13 Drawing Sheets

(51) Int. Cl.
*G05G 1/08* (2006.01)
*F16H 61/24* (2006.01)
(52) U.S. Cl.
CPC .. *F16H 2059/081* (2013.01); *F16H 2061/241* (2013.01); *F16H 2061/247* (2013.01); *Y10T 74/19879* (2015.01)

(56) References Cited

U.S. PATENT DOCUMENTS

| | | | | |
|---|---|---|---|---|
| 2,791,648 | A | * | 5/1957 | Maloney ................ F16H 27/06 200/11 TC |
| 3,236,116 | A | | 2/1966 | Hafferkamp et al. |
| 3,361,005 | A | * | 1/1968 | Carpenter ................ B60Q 1/05 74/436 |
| 4,683,768 | A | * | 8/1987 | Budinski ................ F16H 59/08 74/411.5 |

OTHER PUBLICATIONS

International Search Report dated Nov. 29, 2013 in International Application No. PCT/EP2013/070387 (German language).
Office Action issued Jul. 15, 2013 in German Application No. 10 2012 219 803.2 (German language).

* cited by examiner

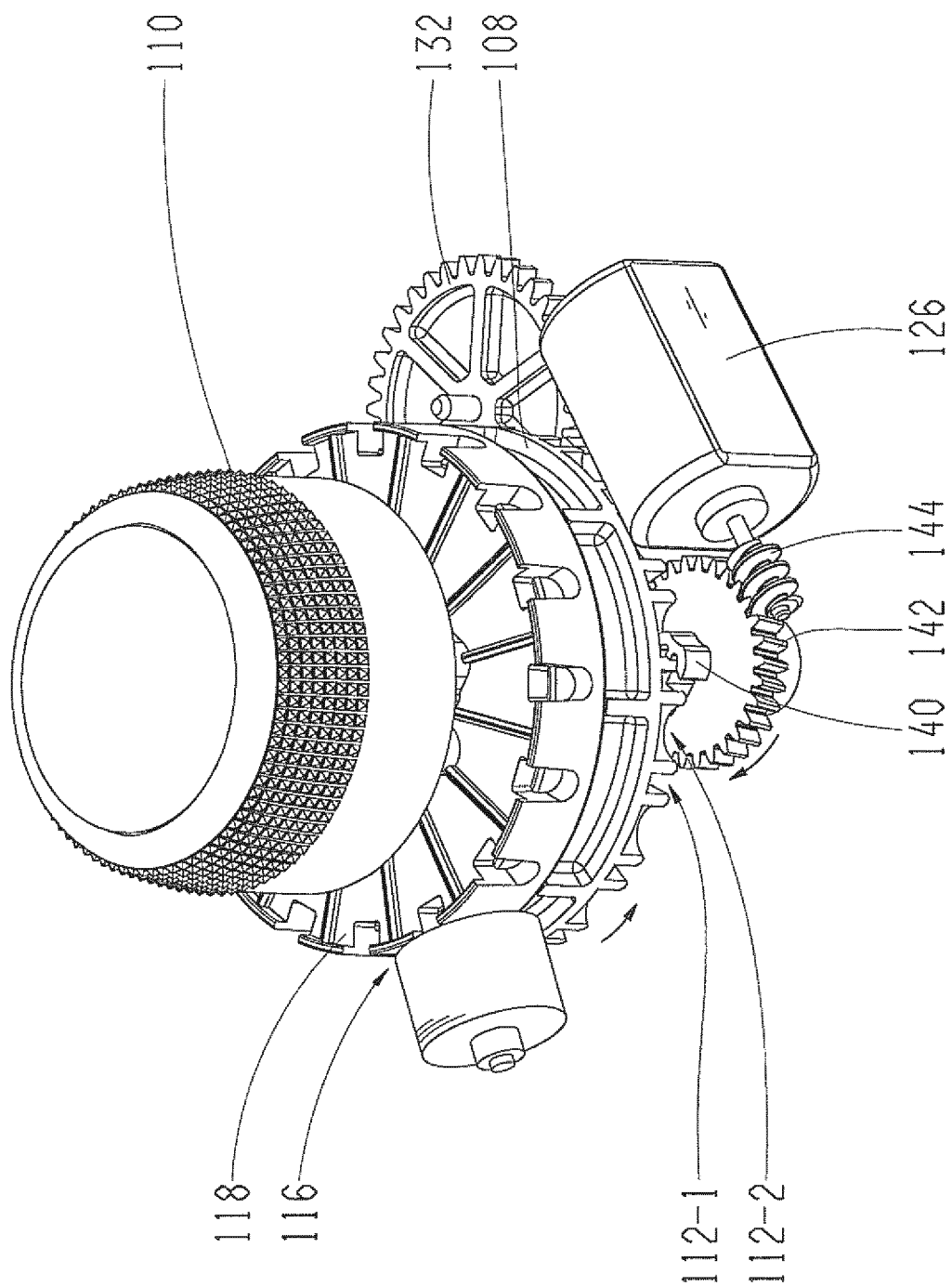

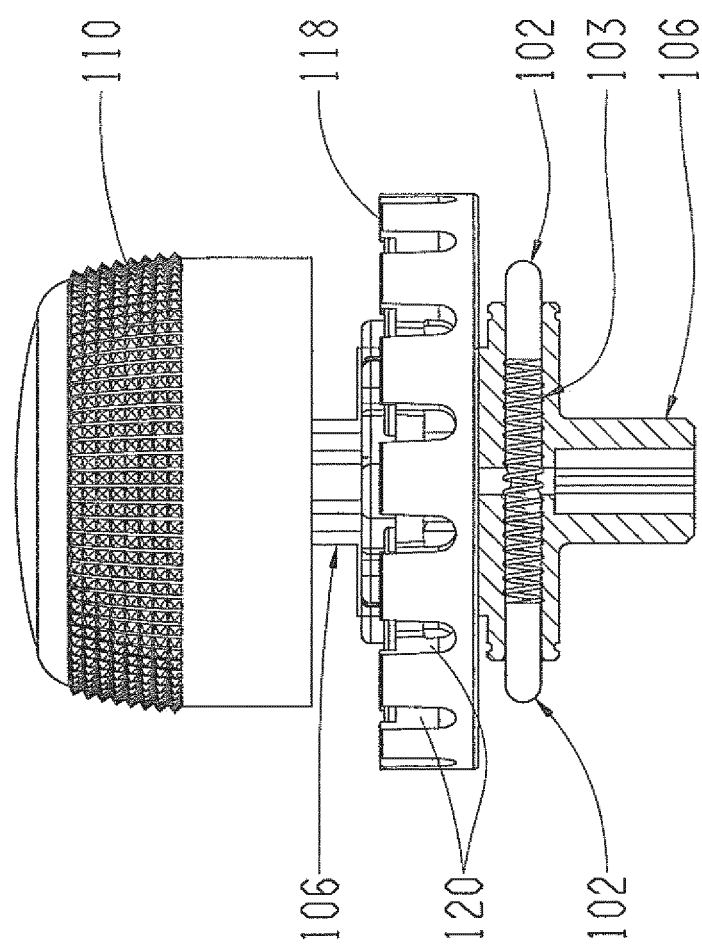

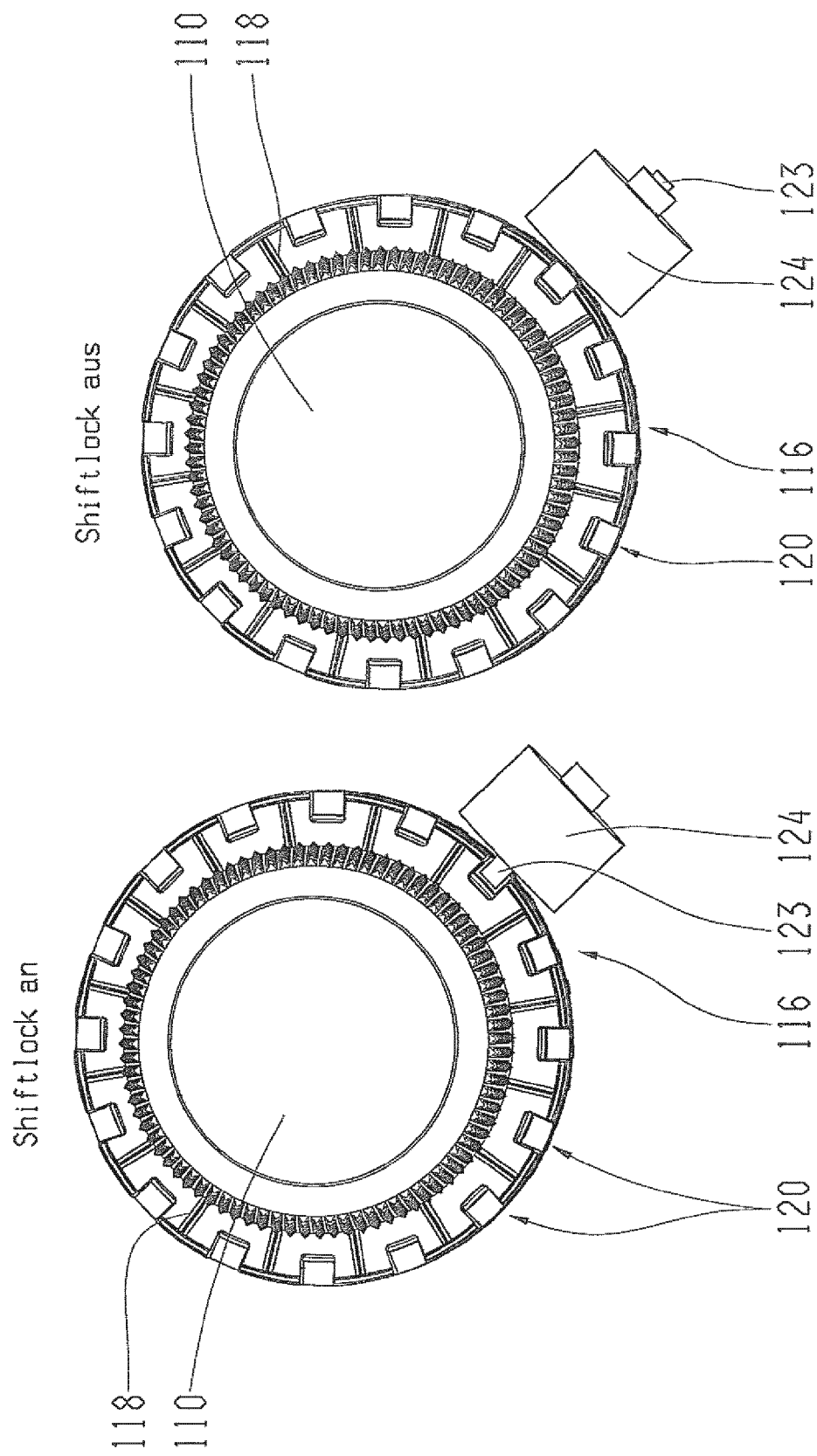

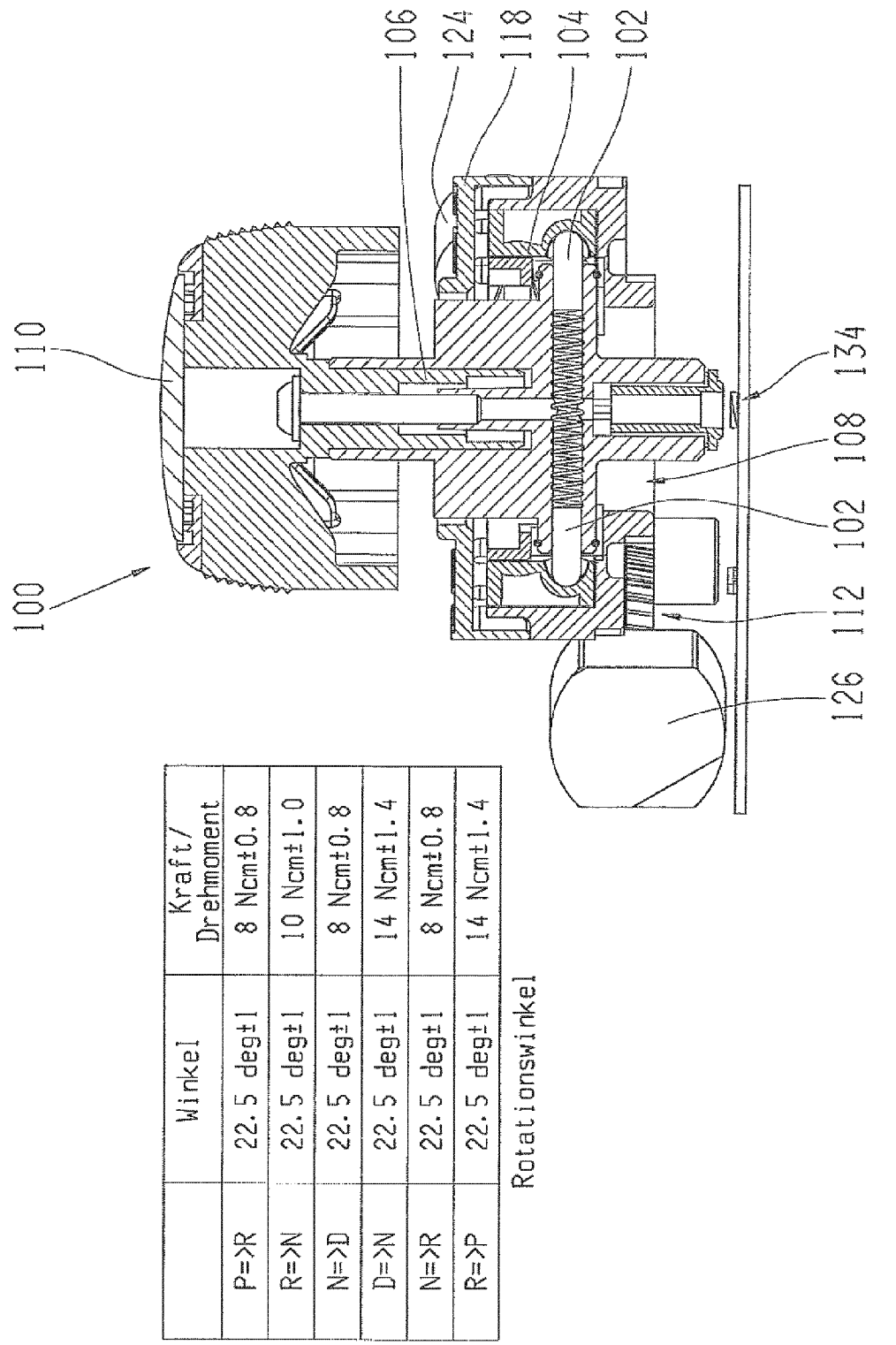

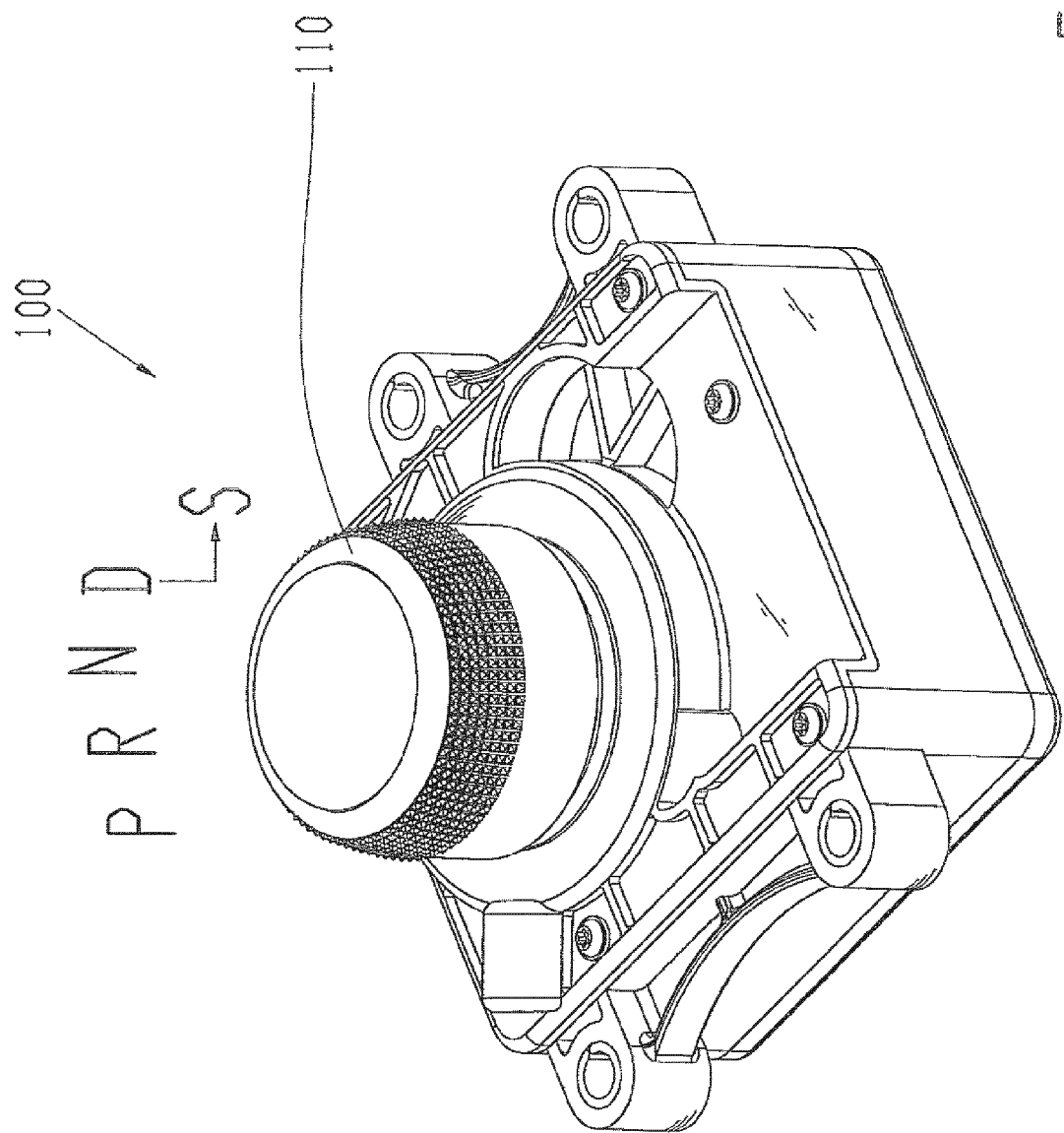

DEVICE AND METHOD FOR SELECTING A SWITCH POSITION

This application is a filing under 35 U.S.C. §371 of International Patent Application PCT/EP2013/070387, filed Oct. 1, 2013, and claims the priority of German Patent Application DE 10 2012 219 803.2, filed Oct. 30, 2012. These applications are incorporated by reference herein in their entirety.

Exemplary embodiments of the present disclosure relate to devices and methods for selecting a switch position out of a plurality of possible switch positions, in particular for automatic actuation of a switching device in order to achieve a desired switch position.

Such devices are used for example, however by no means exclusively, in motor vehicles to operate various systems and functions of the motor vehicle. Numerous systems or functions are electrically operated or electronically controlled in modern motor vehicles. This applies to complex mechanical assemblies of the powertrain such as for vehicle transmissions, as well as for simpler functions such as power seat, windscreen wiper drives, various electronic devices in the vehicle and the like.

However, electrical or electronic controls of such systems not requiring mechanical connection bring with them the aspect that under certain circumstances there does not exist a unique assignment between the position of an actuation element and the state of the system controllable by means of the actuation element, such as a vehicle transmission. In other words, this means that the intended state of the controlled system selected in the actuation or operating element, for example a speed level of the vehicle transmission, does not coincide with the actual switching state of the system or the transmission.

Such a divergence between the states of a technical system and its controls can have different causes. For example, a defective or non-functioning detection of the position of the control element may be present, with the result that, for example, the gear preselected by the driver was not recognized by the system and thus the appropriate command was not given to the transmission. Also conceivable is, for example, a defective or non-functioning transmission of the control command between the control element and the controlled system.

In modern motor vehicles with the ever more interconnected technical system that are used there, there also occurs increasingly often the situation that technical systems, such as vehicle transmission, automatically adapt and change their operating and switching state without the action of the driver. So it is not uncommon, for example, that a by-wire-controlled vehicle transmission automatically takes up the switch position "P" (=parking lock) when the engine stops and the ignition key is removed, or when the driver leaves the car.

Another merely illustrative example is the relatively simple case where the controlled system is a windshield wiper system of a vehicle. Again, it is already known that the windscreen wipers turn on automatically, for example in heavy fog or in rainfall, due to corresponding sensor signals. However, this means that the operating state of the wiper may now no longer be in agreement with the switching state of the actuating element for the wiper.

The actuator thus falsely signals by its unchanged "Off" position that the windscreen wiper is off, when it is actually in operation due to the automatic activation. Even though in the case of the wiper, the actual operating position may also be easily recognizable, there still remains at least the problem that with the possibly required manual intervention in the automatic wiper system, that is to turn off the windshield, the actuating element is already in the "Off" position.

Conventionally, with regard to such incompatibilities one makes do partially with rebounding elastic actuators, which always automatically reset themselves to a neutral position after they have been operated, with some extremely complicated switching logics and corresponding displays that represent both the current operating state of the controlled system and the possible or required directions of movement of the actuator.

With respect to rotation switches for selecting a particular speed level, such as "P" (=Parking lock), "R" (=Reverse), "N" (=Neutral or idle) or "D" (=Drive or forward), switches are known which have stable switch positions. This can be achieved for example by means of a mechanical detent with fixed end stops. A possible additional switch position "S" (=Sport) may be reached, for example, by pressing and turning the rotary knob from the position "D". Known rotary switches include an additional "AutoP" function, which in case an automatic parking brake is engaged in the transmission allows the rotation knob to be turned by means of an actuator from any position to position "P". At the same time, the knob can be lowered. In other variants, however, the knob is neither turned back nor lowered. Rather, the knob is fixed and a detent or snap-in cam can be turned back. Here, in a known design, both the fixing of the detent or snap-in cam as well as the fixing of an operating element in the form of a rotary knob by means of a single actuator is realized (for example, electric motor with a gear). However, this has the disadvantage of the time sequence and thereby causes a disturbing noise of the actuator. The turning back of the snap-in cam from any position to "P" is done by means of a second actuator.

The technical task of the present disclosure is therefore to improve the cited prior state of the art, for example, with regard to component saving, noise reduction and complexity.

This task is resolved by a device and a method having the features of the independent claims.

Advantageous exemplary embodiments and further developments are the subject of the dependent claims and the following detailed description.

According to the present disclosure, on the one hand an efficient and high-resolution rotation of a snap-in cam for selecting a switch position, on the other hand also the reliable fixation by means of a Maltese cross transmission structure and taking advantage of those properties are achieved. The Maltese cross transmission structure in the exemplary embodiments is rotatably coupled to the snap-in cam. For this purpose, both, the Maltese cross transmission structure and the snap-in cam, are molded in a common support member, which relative to a control element is rotatably mounted in a locking pin such as a rotary knob.

According to a first aspect of the present disclosure, a device for selecting a desired switch position out of a plurality of switch positions is provided. Here, a switch position depends on a position of at least one locking bolt or pin relative to a snap-in cam. The snap-in cam defines in the type of a shift gate a catch in the form of a force-displacement curve in translational control elements and a torque rotation angle curve with rotary controls. Further, the snap-in cam represents a parameter that decides how the detent is felt when selecting the switch position. The device comprises a support member that can be arranged underneath an operation surface, such as a center console of a motor vehicle, and can rotate relative to the locking bolt about a shaft. Here, the snap-in cam is formed in the support member, preferably in a peripheral part thereof. Furthermore, the Maltese cross transmission structure is formed in the support member. A Maltese cross transmission, sometimes referred to as a star wheel, is generally known as a transmission gear for the conversion of a circumferential rotation into a circumferential rotation with a plurality of exact detents, i.e. a stepping gear. According to the exemplary embodiments, the Maltese cross transmission structure can be an external Maltese cross transmission. The device further includes a drive being in engagement or in rotationally driving connection with the Maltese cross transmission structure which is adapted to rotate the support member around the shaft with its integral snap-in cam relative to the locking bolt depending on the desired switch position.

In order to occasionally set the locking bolt or knob, for example, in an automatic switch (e.g. AutoP function) or for a blockage of the control element (e.g. shift lock function in one of the switch positions "P" or "N"), the device may additionally have fixing means which are designed to fix the locking bolt or the rotary knob in an absolute angular position of the locking bolt. In particular, the fixing device can be configured to fix the locking bolt or the rotary knob before and during rotation of the support member occurring by interaction of the drive means and the Maltese cross transmission structure relative to the locking pin in an absolute angular position of the locking bolt. Thus could for example be realized the AutoP function.

Both the driving device for the Maltese cross transmission structure and the fixing device can be formed by corresponding actuators or actuators which convert electronic or electrical signals, such as commands issued by a controller, into mechanical motion or other physical quantities.

The drive device for the Maltese cross transmission structure is used in accordance with the exemplary embodiments both for driving and for fixing the support member and thus for the snap-in cam formed therein. The support member can be driven while the fixing device simultaneously fixes the locking bolt in an angular position. Conversely, the support member, that is, the snap-in cam, is fixed, while the locking bolt can be moved by means of the control part in the fixed snap-in cam. Thus, in accordance with the exemplary embodiment, the fixation of the detent integrated in the support member is performed in any position without an actuator purely mechanically by the advantageous use of the Maltese cross transmission and taking advantage of its blocked or standstill position. With this type of transmission, the control element (e.g. a knob) can be made with very little play. Also, no disturbing noise arises during the fixation of the snap-in cam.

In contrast, the fixing device is primarily used for fixing an absolute angular position of the locking bolt or the control element that is rotatably coupled thereto, namely during the time when the drive means brings the Maltese cross transmission structure into rotation. For this purpose, the fixing means may have a locking disc that is rotationally coupled to the locking bolt, the locking disc having a plurality of recesses arranged at its periphery, wherein each of the recesses may correspond to one of the switch positions. A locking device can be designed to lead at least one of the recesses of the locking disc in order to fix the absolute angular position of the locking bolt. For this purpose, the locking device can have for example an electric motor to actuate the locking bolt. This makes possible a very fast and quiet fixing of the locking bolt or the rotatably connected control element (e.g. rotary knob).

According to some exemplary embodiments, the actuating drive device for the Maltese cross transmission structure can have a controlled electric motor, as a function of an absolute angular position of the Maltese cross transmission structure and/or as a function of an absolute angular position of the locking bolt (or a device coupled to it), and a mechanical drive structure that is drivable by means of the electric motor and is engaged in the Maltese cross transmission structure for the rotatable support member. From the absolute angular position of the Maltese cross transmission structure or the support member can be derived an absolute angular position of the locking bolt, and thus also a corresponding switch position. In order to detect the respective absolute angular positions, one or more corresponding sensors or detectors may be provided. They can be based on mechanical, electrical and/or optical modes of operation. The electric motor and the cooperating drive structure together form an actuator, by means of which the turning back of the detent can be made from any position to a desired switch position (such as "P").

The drive structure may, for example, comprise a cogwheel structure (Maltese cross drive wheel) with a first engagement element of the cogwheel structure arranged on an end face that faces one of the Maltese cross transmission structures and a second engagement element arranged on the end face, wherein the first and the second engagement elements during the rotation of the gear structure alternately engage in the Maltese cross transmission structure to cause an intermittent rotation of the Maltese cross transmission structure (with the standstill and rotation phases). Furthermore, the drive structure can comprise a worm (worm drive) that is rotatable by means of the electric motor and is engaged with its cogs located on the periphery of the cogwheel structure, in order to be able to bring into rotation the cogwheel structure or the Maltese cross transmission by interaction between the rotating worm drive and the cogs. The electric motor with a worm drive can thus drive a Maltese cross drive wheel, which is in engagement with the Maltese cross contour integrated in the support and thus can turn back the detent or snap-in cam, which is also integrated in the support, to the desired switch position (e.g. "P").

According to some exemplary embodiments, the device can be designed to select a desired gear stage out of a plurality of gears, such as "P" (=Parking lock), "R" (=Reverse), "N" (=Neutral or idle) or "D" (=Drive or forward) of a motor vehicle. According to another aspect of the present disclosure, a motor vehicle with a device according to the present disclosure is provided. Of course, the possible applications of a device according to the present disclosure are various and not limited to the selection of gear stages. For example, wipers intervals can be set likewise. Applications other than in a vehicle are also conceivable, such as the use in household appliances.

According to still another aspect of the present disclosure, a method for selecting a desired switch position out of a plurality of switch positions is provided, wherein a switch position depends on a position of at least one locking bolt relative to a snap-in cam. The method comprises arranging a support member for an operating element rotatable around a shaft relative to the locking bolt, wherein the snap-in cam is formed in the support member, and wherein a Maltese cross transmission structure is formed in the support member. Further, the method comprises a step of rotating the support member by means of a drive device engaged with the Maltese cross transmission structure so that the support member together with the snap-in cam rotate, relative to the locking bolt, around the shaft as a function of the desired switch position. The twisting may in this case be controlled by an electronic control device.

Some exemplary embodiments of the present disclosure will now be explained below with reference to the accompanying figures. In the drawings.

Figure 1:
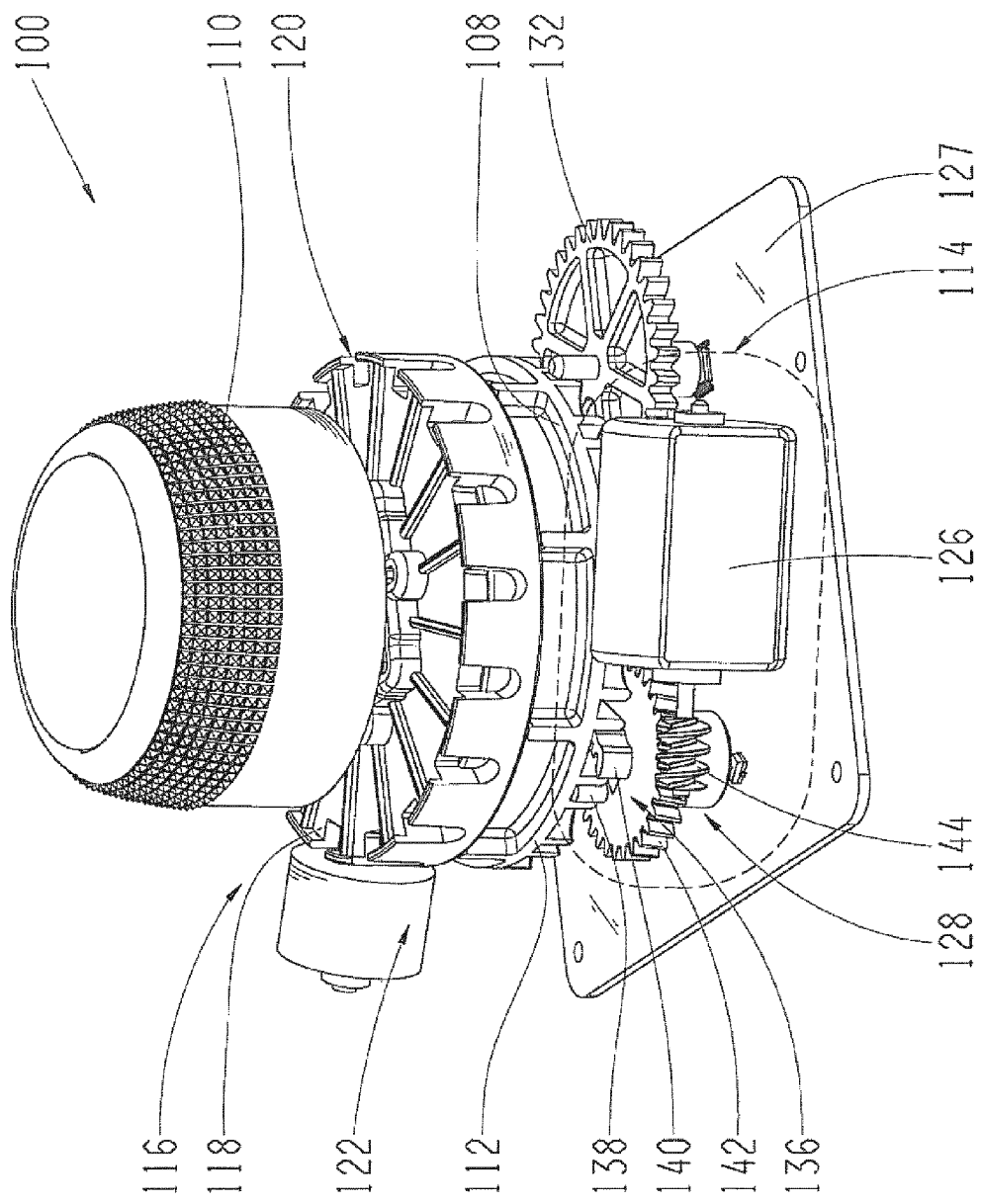
FIG. 1 is an isometric representation of a device for selecting a desired switch position out of a plurality of switch positions, according to one exemplary embodiment.

FIG. 3a-g shows a movement of the Maltese cross transmission structure by means of a full rotation of a drive wheel;

FIG. 4 shows a torque-resistant coupling of a control element, locking disc and locking bolt via a shaft;

FIG. 5 shows a plan view of the locking mechanism for the control element;

FIG. 6 shows a cross-sectional view of the device of FIG. 1; and

FIG. 7 shows a representation of the device of FIG. 1 with housing.

In the following description of some exemplary embodiments with reference to the accompanying drawings, same reference numerals designate the same or at least functionally similar components.

FIG. 1 shows an isometric representation of a device 100 for selecting a desired switch position out of a plurality of switch positions according to a possible exemplary embodiment of the present disclosure. In the device 100 a selected switch position depends on a position or angular position of at least one locking bolt, not visible in FIG. 1, relative to a snap-in cam likewise not visible.

The device 100 comprises a support member 108 that can be arranged below an imaginary user interface, such as a center console of a motor vehicle, being rotatable around a visible shaft or axle relative to the locking bolt and supporting a control element 110 that is arranged above the user interface. The snap-in cam is formed in the support member 108. The control element 110 is in the illustrated exemplary embodiment a knob, which is coupled torque-resistant to at least one locking bolt (not visible in FIG. 1) by means of a shaft extending from the rotary knob 110 to the rotatable support member 108. By rotation of the knob 110 thus also rotates the locking bolt relative to the snap-in cam integrated in the support member 108. The characteristic feature is that the support member 108 is formed in or on the Maltese cross transmission structure 112, as one can see especially in one of the illustrations of FIG. 2.

Figure 2:
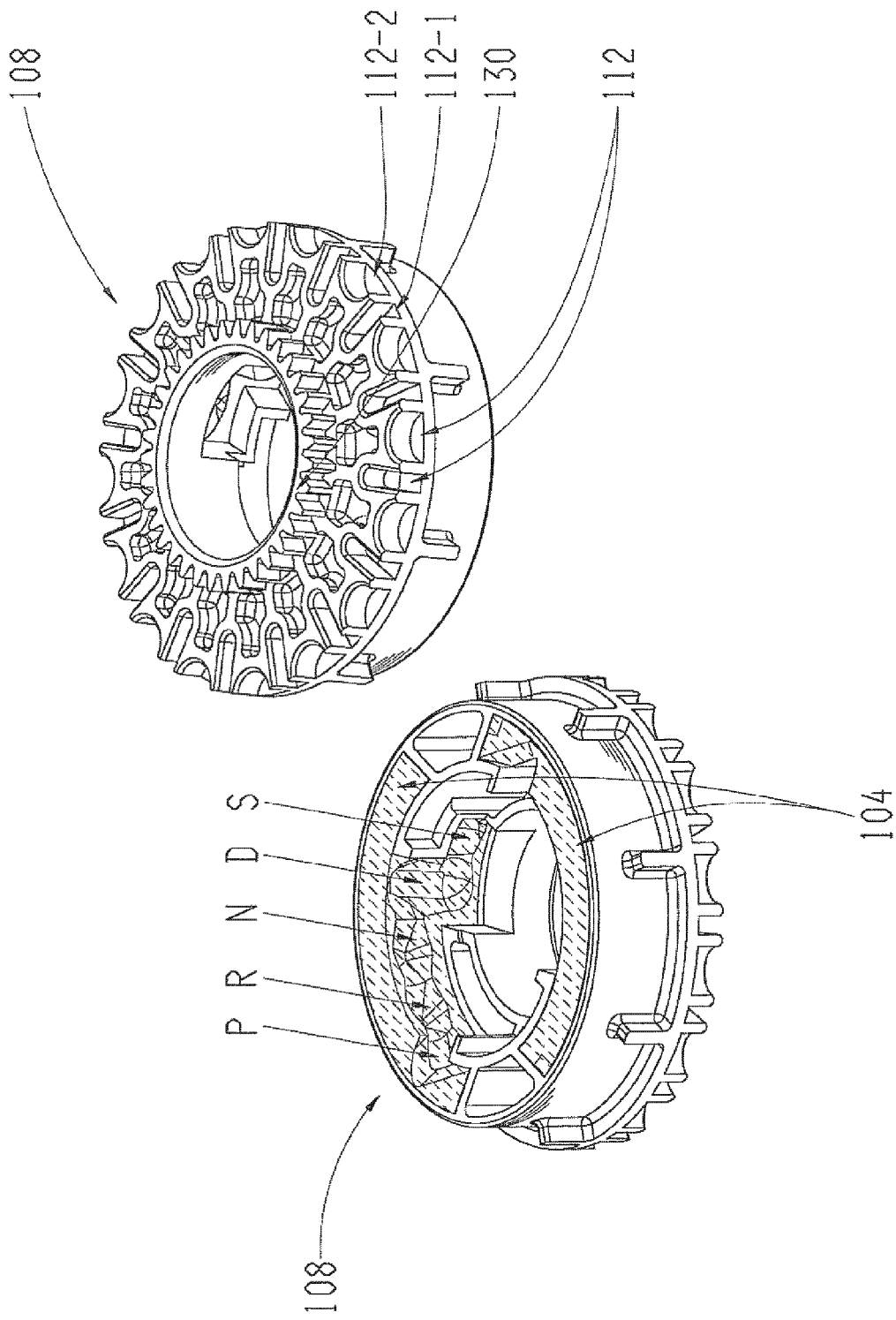
FIG. 2 shows perspective views of the lower and upper sides of a support member according to an exemplary embodiment.

FIG. 2 shows on the left an isometric view of the top of the support member 108 or rather its side facing the control element 110 in the axial direction.

On the left side of FIG. 2 can be seen the snap-in cam or detent 104 that is formed in the support member 108. The detent 104 is formed in the opposite (i.e. at) 180° inner peripheral regions of the support member 108 rotatable about an axle or shaft. Different detents designated with "P", "R", "N", "D" and "S" denote the various switch positions selectable by the device 100, e.g. speed levels of a motor vehicle or an automatic transmission. While the switch positions "P", "R", "N", "D" are located in an axially upper region of the snap-in cam 104, the switch position "S" is located in an axially further below situated region of the snap-in cam 104, which can be reached from the switch position "D" by pressing and/or turning the control element or the rotary knob 110 and the locking bolt coupled thereto, as will become clear later.

As already mentioned, the bottom side of the support members 108 can have the Maltese cross transmission structure 112, which in turn comprises radial slots 112-1 and circular segment locks 112-2 which are alternately arranged in the circumferential direction, see FIG. 2 the right.

Strictly speaking, the illustrated Maltese cross transmission structure 112 is an external Maltese cross transmission, which can be formed in or on the underside of the support members 108. In addition, the underside of the rotatable support members 108 can comprise a ring-shaped cogwheel structure 130 for detecting an absolute angular position of the Maltese cross transmission structure 112 or the support 108, wherein the cogwheel structure can be brought in engagement with a sensor cogwheel (not shown in FIG. 2) for determining the absolute angular position of the support member or the Maltese cross transmission structure 112. That will also be explained further below. The Maltese cross transmission structure 112 and the cogwheel structure 130 can be formed concentric to each other and rotationally symmetric.

Returning to the device 100 shown in FIG. 1, it can further comprise a drive device 114 that is in engagement with the Maltese cross transmission structure 112, wherein the drive device is designed to rotate the support member 108 with the snap-in cam 104 integrated therein in a circumferential area, relative to the at least one locking bolt or pin depending on the desired switch position "P", "R", "N", "D" or "S" around the shaft, which acts as a rotation axle.

According to the illustrated exemplary embodiment, the drive device 114 can comprise an electric motor 126 controllable as a function of an absolute angular position of the Maltese cross transmission structure 112 and the support member 108 and/or as a function of an absolute angular position of the locking bolt or the torque-resistant connected rotary knob 110. A relevant control device is not explicitly shown, but can also be arranged on a circuit board 127.

The drive device 114 can further comprise a drive structure 128 for the rotatable support member 108 or the Maltese gear 112, wherein the drive structure 128 is driven by the electric motor 126 and is in engagement with Maltese cross transmission structure 112. As can be seen in FIG. 1, the drive structure 128 can in turn comprise a cogwheel structure 136 having a first engagement member 138 (driver pin) that is arranged on the front side of the cogwheel structure 136 that faces the Maltese cross transmission structure 112 and a second engagement member 140 (locking pin) arranged on the end face, wherein the first and the second engagement members 138, 140 during a rotation of the cogwheel structure 136 alternately engage in the radial slots 112-1 and 112-2 of the Maltese cross transmission structure 112 in order to cause an intermittent rotation of the Maltese cross transmission structure 112. Furthermore, the mechanical drive structure 128 can comprise a helical screw 144 that is rotatable by a means of the electric motor 126 and is in engagement with cogs 142 located on the periphery of the cogwheel structure 136 in order to set the drive cog wheel structure 136 into continuous rotation by an interaction between the rotating helical screw 144 and the cogs 142.

The operation of the drive device 114 for the Maltese cross transmission structure 112 is particularly clear in FIGS. 3a to 3g, which illustrate a movement sequence of the Maltese cross transmission structure 112 and the support members 108 on the basis of a full revolution of the drive wheel 136.

Figure 3A:
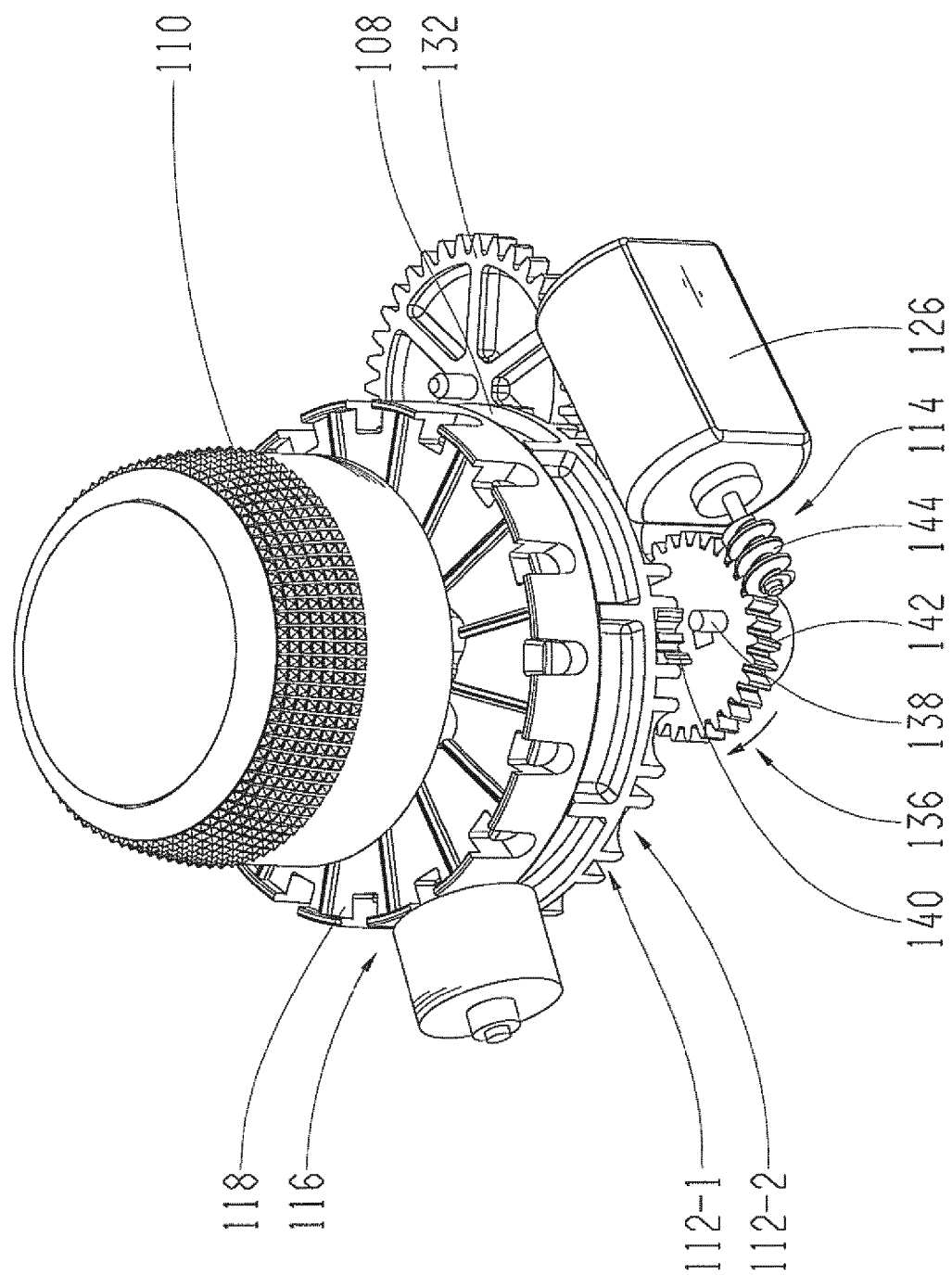

FIG. 3a shows the drive gear 136 and the Maltese cross transmission structure 112 connected to it by the engaging members 138, 140 in their initial position. As can be seen in FIG. 3a, the second engagement member or the locking member 140 in this position engages with a circular segment lock 112-2 of the Maltese cross transmission structure 112. The first engagement member or the driver pin 138 is located outside the Maltese cross transmission structure 112, which means it is not engaged with a radially extending slot 112-1. Although the cogwheel structure 136 shown in this example continuously rotates clockwise (driven by the screw 144 and the electric motor 126), the Maltese cross transmission structure 112 is secured against rotation in the position of FIG. 3a by an anti-rotation security device formed by the circular segment lock 112-2 and the locking pin 140 engaging therein. Thus, in the position shown in FIG. 3a, the rotatable support member 108 is at a standstill despite the rotating cogwheel structure 136. On the other hand, the control element 110 is during the rotation of the drive wheel secured against rotation by a fixing device 116, as will be shown in more detail below.

During the relative position between the drive wheel 136 and the Maltese cross transmission structure 112 engaged therein shown in FIG. 3b, the driver pin 138 of the cogwheel structure 136 is in engagement with a radial slot 112-1 of the Maltese cross transmission structure 112 so that the support member 108 rotates counter-clockwise (i.e. in counter-direction of the rotational movement of the cogwheel structure (136).

In contrast, the locking pin 140 is not engaged with a circular segment lock 112-2 of the Maltese cross transmission structure so that in this phase total rotational movement of the support members 108 is possible.

Figure 3C:
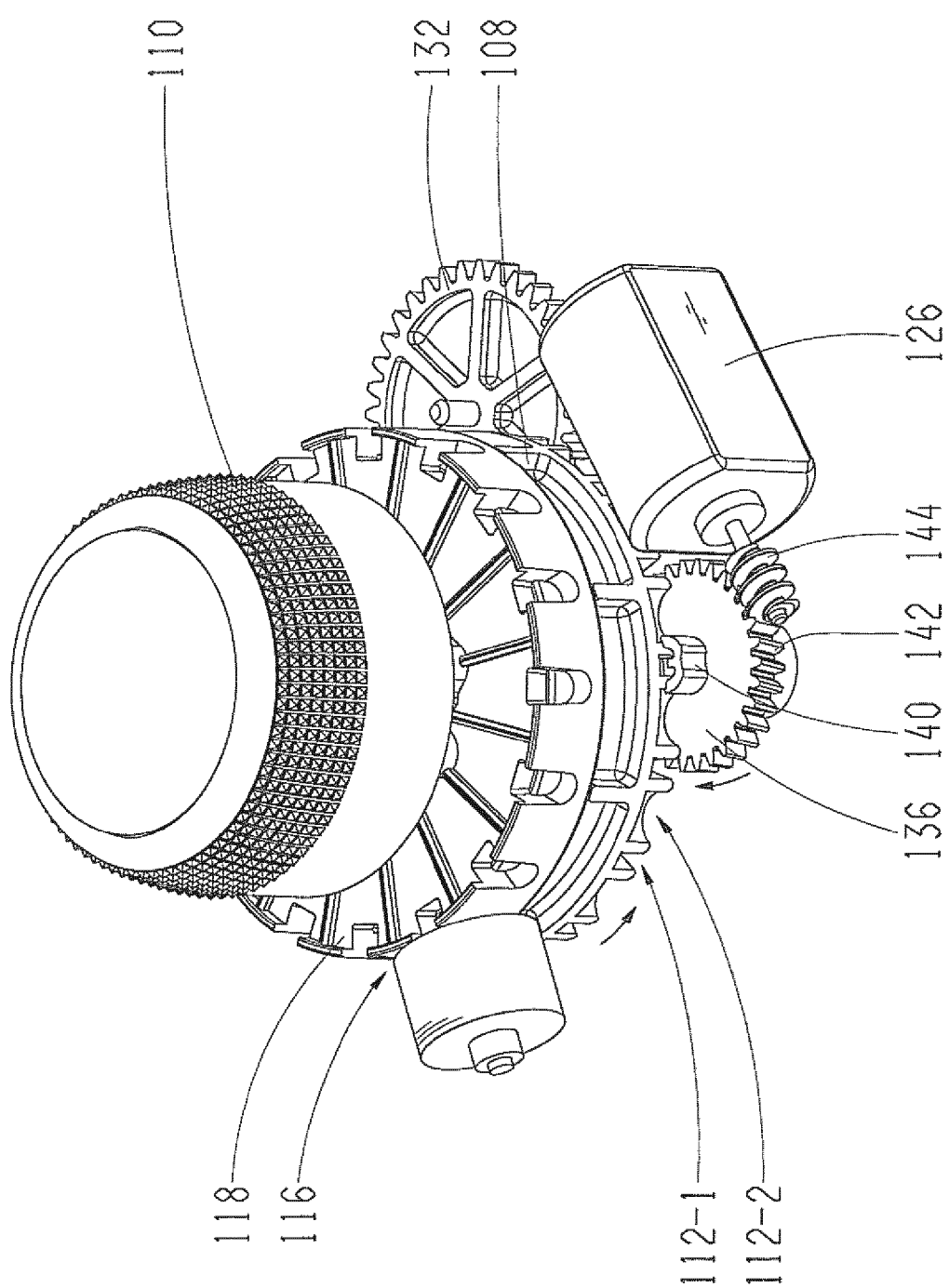

FIG. 3c shows the same arrangement, in which, in contrast with the description of FIG. 3b, the support member 108 was further rotated counter-clockwise. As before, the driver pin 138 of the cogwheel structure 136 continues to be is engaged with the radial slot 112-1 and the locking pin 140 does not engage with a circular segment lock 112-2 of the Maltese cross transmission structure 112. In this phase, the rotation of the drive wheel 136 is converted by means of the driver pins 138 and the Maltese cross transmission structure 112 into a counter-rotation of the support member 108.

Figure 3D:
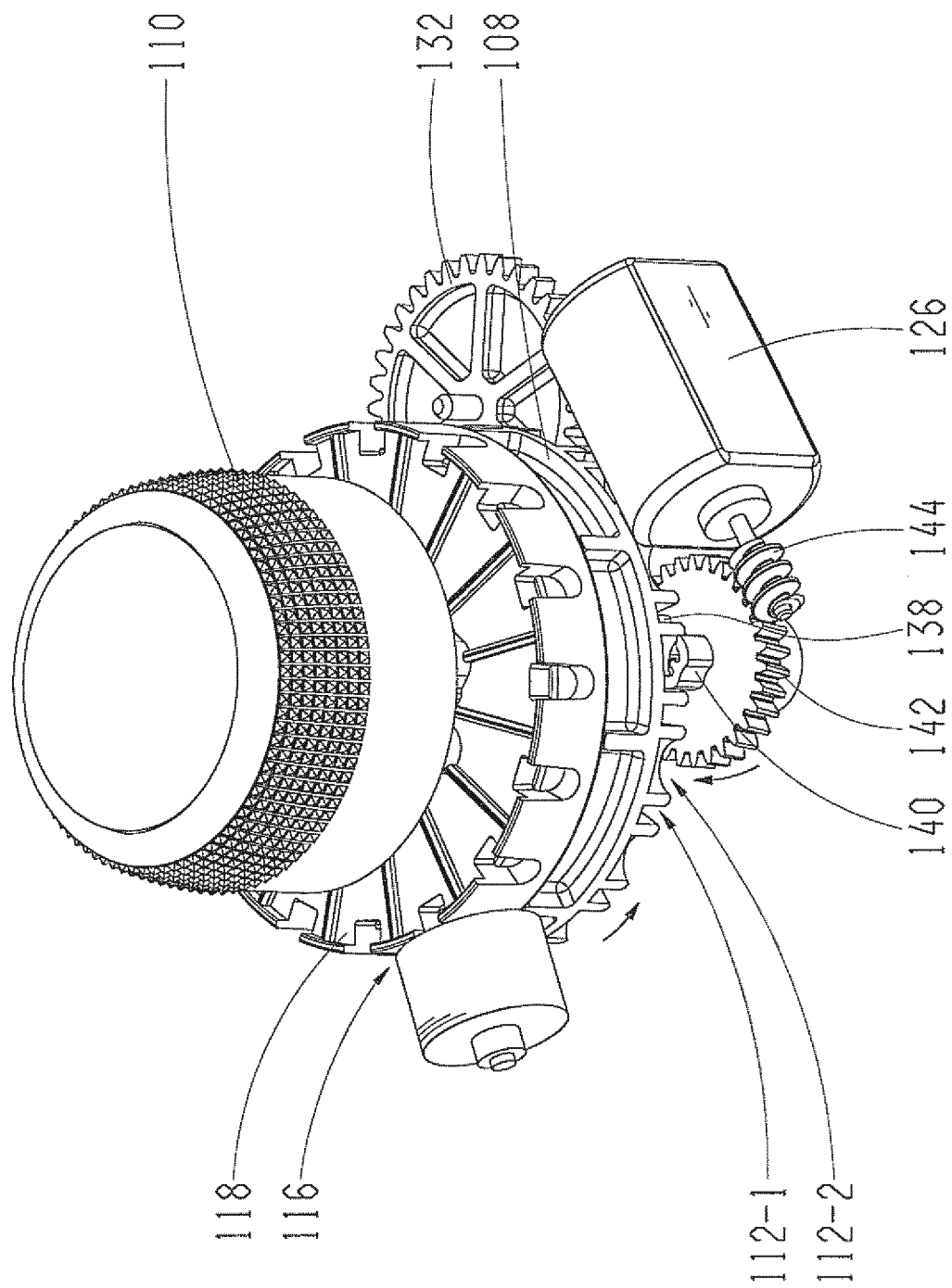

FIG. 3d shows the support member 108 in a comparison with FIG. 3c in a further counter-clockwise rotated state. Here, the driver pin 138 of the cogwheel structure 136 is in a position just before exiting the radial slot 112-1 of the Maltese cross transmission structure 112. This compares with the locking pin 140 in a position shortly before the engagement in a circular segment lock 112-2 of the Maltese cross transmission structure 112.

Figure 3E:
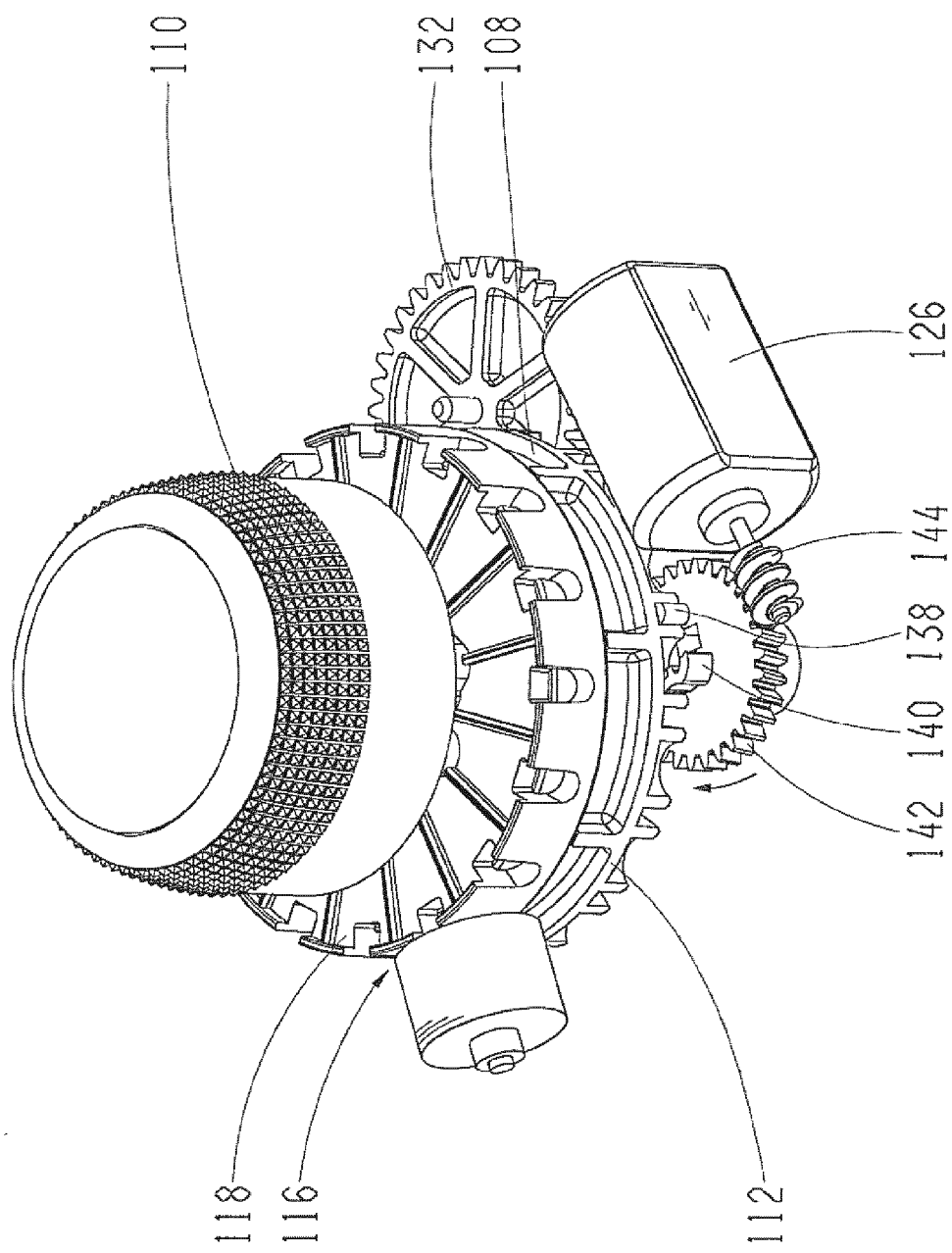

FIG. 3e shows the driver pin 138 exiting from the radial slot 112-1 of the clockwise rotating cogwheel structure 136, as well as the locking pin 140 entering the adjacent circular segment lock 112-2. Here we find the support member 108 just in the transition from the movement phase to the stationary phase. In this case, a stationary phase can for example always correspond with just a specific switch position ("P", "R", "N", "D", "S") in the snap-in cam 104.

Figure 3F:
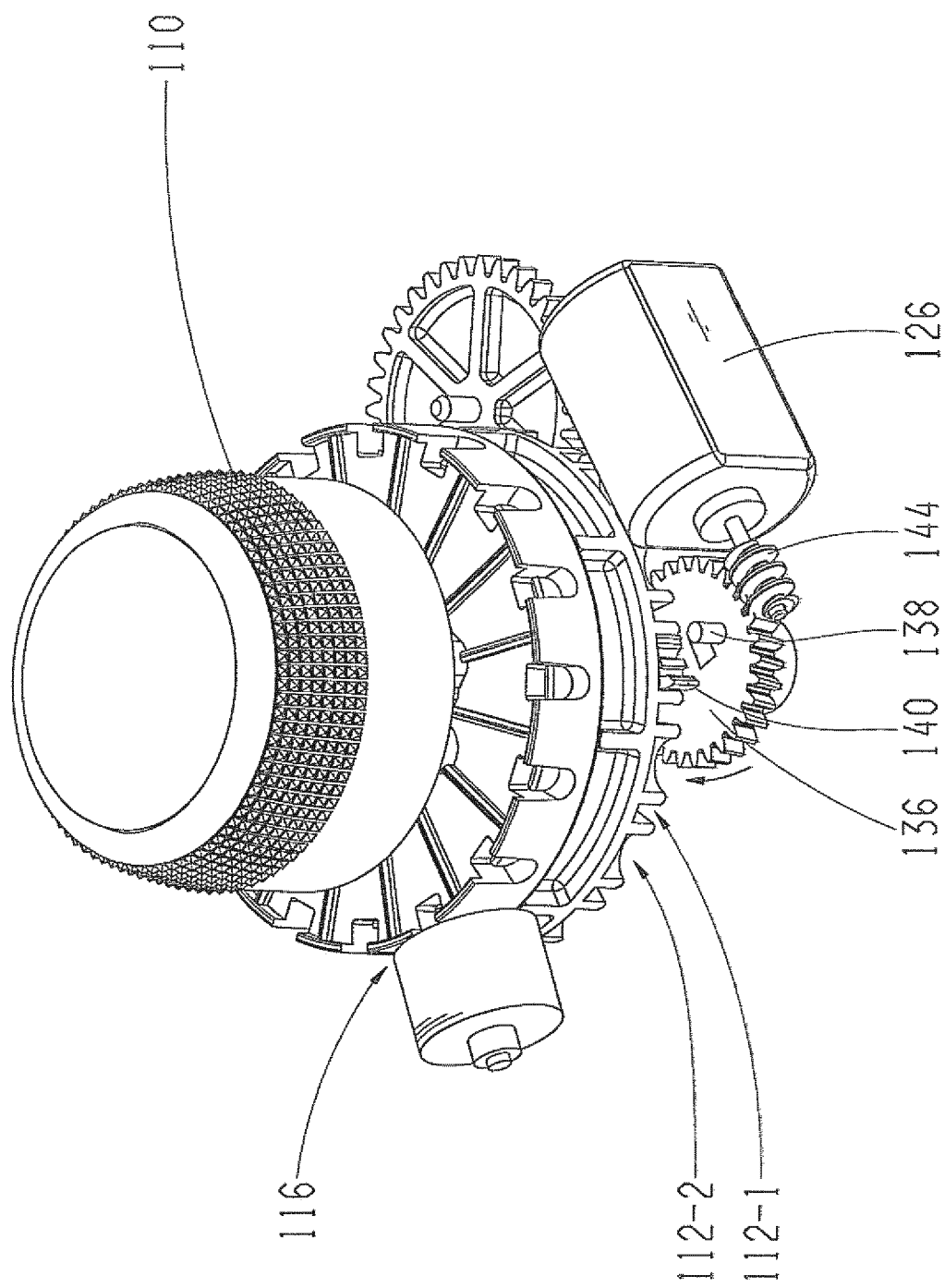
Figure 39:
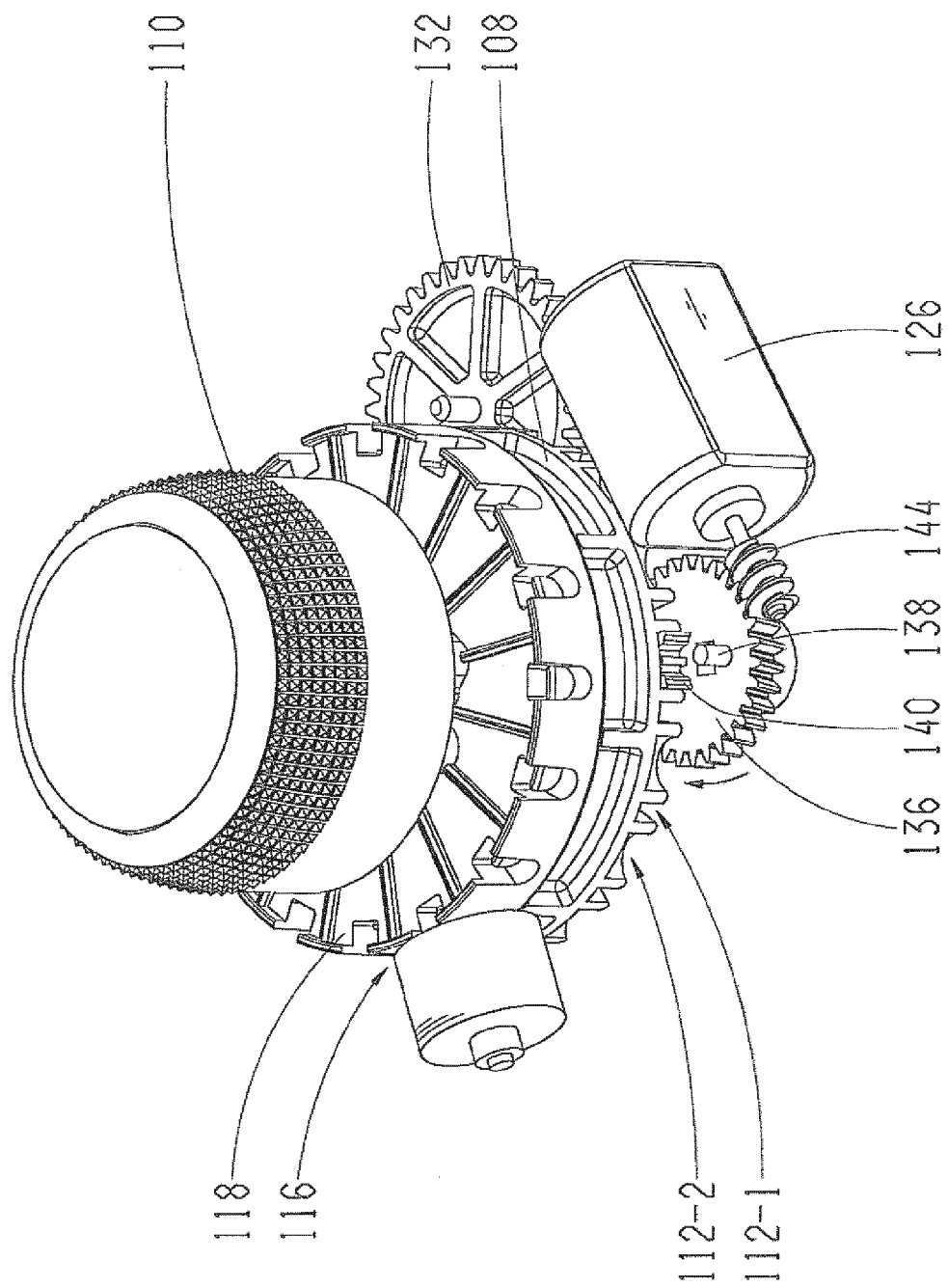

FIGS. 3f and 3g also relate to the stationary phase of the support member 108 with the further clockwise rotating cogwheel structure 136.

In summary, FIGS. 3a to 3g represent a full rotation of the cogwheel structure 136 that drives the support member 108. This full rotation by 360° of the cogwheel structure 136 can be divided here into a stationary phase and a phase of movement of the Maltese cross transmission structure 112 that is in engagement with the cogwheel structure 136. During the stationary phase, the support member 108 is inherently secured against rotation and play in the circumferential direction by the geometry of the Maltese cross transmission structure 112 and the locking bolt 140 engaging therein. This can be advantageously used for fixing the support members 108, in the event that a switching movement is to occur by means of a rotation of the rotary knob 110, instead of the just described rotation of the support members 108.

After a detailed description of the support member 108 and its Maltese cross transmission structure 112 interacting with the drive means 114, hereinafter a locking function for the control element or the rotary knob 110 is considered in more detail.

According to exemplary embodiments, the device 100 shown in FIG. 1 can further comprise a fixing device 116 which is adapted to fix the control element 110 (and the non-rotatably coupled locking bolt) in an absolute angular position before and during a rotation of the support members 108 relative to the control unit 110 and the locking bolt by cooperation of the drive device 114 and the Maltese cross transmission structure 112. According to the exemplary embodiment shown here, for this purpose the fixing device 116 can comprise a locking disc 118 rotationally coupled to the control element 110 or the locking bolt, on the periphery of which a plurality of recesses 120 can be arranged. In this case, each of the recesses 120 can correspond to one of the switch positions ("P", "R", "N", "D", "S"). Further, the fixing device 116 can have a locking means 122 which is to lead a locking pin into at least one of the recesses 120 of the locking disc 118 in order to fix the locking bolt or the control element 110 in the absolute angular position.

As previously described and can now be seen particularly in FIG. 4, the control element 110 (rotary knob), the locking disk 118 and two locking bolts 102 can be rotation-resistant coupled via a shaft 106. The shaft 106 can engage, by its lower region (in the axial direction, i.e. the region below the locking bolt 102), with the centrally arranged circular opening of the support member 108 provided for this purpose (see, e.g., FIG. 2). The locking bolts 102 rounded at their radial ends, which are so mounted as being displaceable in the radial direction by a spring 103, can in their assembled state engage in the peripheral region of the detent 104 formed in the support member 108. By turning and/or pushing the rotary knob 110, the locking bolts 102 take up different switch positions ("D", "S", "P", "R", "IM") in the snap-in 104.

As has already been described, locking pins can engage in the openings or recesses 120 of the locking disc 118 that is arranged between the support member 108 and the control element 110 in order to fix the locking bolt 102 and thus the control element 110 during an (intermittent) rotation of the support member 108 in an absolute angular position. Due to this process, the locking bolt 102 and the snap-in cam 104 can be rotated relative to each other, e.g. to implement the AutoP function. This is illustrated using FIG. 5.

FIG. 5, left, shows the control element 110 fixed in a predetermined angular position ("Shift lock on" in a plan view. As can be seen, a locking pin 123 engages with a recess 120 located on the circumference of the locking disk 118, thus preventing rotation of the rotary knob 110. In the exemplary embodiment shown here, a total of 16 recesses 120 are arranged on the locking disc 118 in the circumferential direction. This corresponds to separate recesses 120 rotated by an angle of 22.5°, which is to be understood only as an example.

According to one exemplary embodiment, the locking pin 123 can be manufactured of a magnetic or ferromagnetic material so that it can be actuated by an electromagnet 124 of the locking device 122. For example, the locking pin 123 can, with the electric power on, change from a radially outer switch position ("Shift lock off") change to a radially inner switch position ("Shift lock on"), and thus trigger the lock or fixing mechanism for the control element 110 and the locking bolt 102 rotatably coupled thereto. While the FIG. 5, left, shows the control element 110 secured against rotation, FIG. 5 shows the freely rotatable control element 110, i.e. without fixation. The locking pin 123 radially retracted here so that a rotation of the control member 110 together with the locking disc 118 and the locking bolt 102 relative to the support member 108 (then fixated) is possible.

FIG. 6 shows the device 100 for selecting a desired switch position in a sectional view. It can be seen that, viewed in axial direction, i.e. in the direction along the rotational axis of the shaft 106, the control element 110 is arranged above the locking disk 118. The locking bolts 102 arranged below the locking disc engage with the structure of the snap-in cam 104, which is formed in an inner peripheral region of the support members 108. By pressing and/or turning the control member 110 downward, as it has already been explained with reference to FIG. 2, one can switch from a switch position "D" in an axially upper region of the snap-in cam 104 to a switch position "S" in the axially lower region of the snap-in cam 104.

In a first operating mode, the support member 108 is fixed, i.e. non-rotatable. This step corresponds for example to a locking position of the cogwheel structure 136 and the Maltese cross transmission structure 112, as shown in FIG. 3a. In this first operating mode, for example, a driver of a motor vehicle can actuate the rotary knob 110 and thus rotate or shift the locking bolt 102 along the contour of the snap-in cam 104. This means that in this first operating mode, the support member 108 is fixed against rotation and the switch positions are changed using the control unit 110.

In a second operating mode, the situation is exactly the opposite. That is, here, the control element 110, and thus also the locking bolt 102, are secured against rotation by means of the fixing means 116. In contrast to the first operating mode, the support member 108 with its built-in snap-in cam 104 can be rotated relative to the fixed control unit 110 or the locking bolt 102. This is done, as already explained, by means of the actuator drive device 114. According to the exemplary embodiments, the drive device 114 can thus be designed to rotate the support member 108 relative to the locking pin 102 while the locking bolt 102 is fixated in its absolute angular position by means of the fixing device 116. This allows, for example, a reverse travel to a P position of an automatic transmission (AutoP function).

As has already been explained, the drive device 114 can comprise a controllable electric motor 126 as a function of the absolute angular position of the support members 108 and/or as a function of the absolute angular position of the locking bolt 102 (or a member coupled therewith). For determining the absolute angular position of the Maltese cross transmission 112 or the support member 108, the rotatable support member 108 can comprise an annular cogwheel structure 130 (see FIG. 2, right), which can be brought in engagement with a sensor cogwheel 132 (see FIG. 1 and FIG. 3a to g) for determining the absolute angular position of the support member 108. Furthermore, the device 100 can comprise a further angle detection means 134, which is configured to detect an absolute angular position of the locking bolt 102 and/or the shaft 106. From the so determined absolute angular positions of the components 110 and 108 that are rotatable relative to each other can then be determined the angles of the individual switch positions ("S", "P", "R", "N", "D"). The rotary switch 100 can thus be equipped with an absolute position sensor. The switching positions ("P", "R", "N", "D", "S") can be detected by the direct sensing of the rotational axle of the rotary knob 106. The position of the detent after "AutoP" can be detected by the position of the sensor cogwheel 132. The support member 108 can be turned back by the actuator 114 until the sensor values of the rotary knob axis 106 or the sensor 134 and the sensor cogwheel 132 match a predefined value relative to each other. Thus, it is possible to automatically move to any switch position. The relative rotations of the control element 110 and the support member 108 are possible both clockwise and counter-clockwise. Exemplary detent forces which must be overcome are shown in FIG. 6.

By using the Maltese cross transmissions or the Maltese cross transmission structure 112 on the support member 108, one can get, in interaction with the drive device 114, better gear ratios compared to the prior art. This allows to use a simple electric motor 126 with a coarser resolution compared to the prior art. Furthermore, the exemplary embodiments allow greater accuracy and a low-noise positioning function. In addition, adverse interaction between the drive actuator 114 and the support member 108 can be avoided.

In some exemplary embodiments of the present disclosure, all or at least some of the described components can be made of plastic, in particular in order to save in weight and economic manufacturing methods, and to be able to use injection molding. Of course, a certain strength and wear resistance of the components should be provided, in particular with regard to the cogging forces to be overcome.

FIG. 7 shows a summary of the device 100 with its control element 110 in a housing. The device 100 shown here can for example be adapted for selecting a desired gear out of a plurality of speed levels of a motor vehicle or a transmission. The exemplary embodiments therefore also include a vehicle with an integrated inventive selection device 100.

The features disclosed in the foregoing description, the appended claims and the drawings can be important for realizing the present disclosure in its various exemplary embodiments both individually and in any combination.

Although some aspects of the present disclosure have been described in the context of a device, it should be understood that these aspects also represent a description of a corresponding method, so that a block or a component of a selection device should be understood as a corresponding method step or a feature of a process step, e.g. a method for selecting a desired switch position out of a plurality of switch positions. Similarly, aspects that have been described in connection with a method step or as an individual method step also represent a description of a corresponding block or detail or feature of a corresponding device.

The above-described exemplary embodiments are merely illustrative of the principles of the present disclosure. It is understood that modifications and variations of the arrangements and details described herein will be apparent to other persons skilled in the art. Therefore, it is intended that the present disclosure is limited only by the scope of the following claims and not by the specific details which were presented with reference to the description and the explanation of the exemplary embodiments.

REFERENCE NUMERALS

100 Means for selecting a desired switch position according to an exemplary embodiment
102 Locking bolt
104 Snap-in cam 106 Shaft or rotation axle
108 Support member
110 Control element or rotary knob
112 The Maltese cross transmission or Maltese cross transmission structure
114 Drive device or drive actuator
116 Fixing device or fixation actuator
118 Locking disc
120 Recesses of a locking disc
122 Locking device
123 Locking pin
124 Electromagnet
126 Electric motor
127 Circuit board
128 Drive structure
130 Annular Cogwheel structure
132 Sensor cogwheel
134 Angle detection means
136 Cogwheel structure or cogwheel
138 Driver pin
140 Locking pin
142 Cogs
144 Worm or worm wheel

The invention claimed is:

1. A device for selecting a desired switch position out of a plurality of switch positions, said device comprising:
a support member being rotatable around a shaft, relative to at least one locking bolt and a control element, wherein a snap-in cam is formed in the support member forming a Maltese cross transmission structure, and a switch position depends on a position of the at least one locking bolt relative to the snap-in cam; and
a drive device engaging with the Maltese cross transmission structure, the drive device configured to rotate the support member with the snap-in cam relative to the locking bolt depending on the desired switch position.

2. The device according to claim 1, further comprising a fixing device configured to fix the at least one locking bolt in an absolute angular position.

3. The device according to claim 2, wherein the fixing device comprises:
a locking disc coupled rotation-resistant to the at least one locking bolt, wherein on the circumference of the locking disc is arranged a plurality of recesses, each of said recesses corresponding to one of the switch positions; and
a locking device configured to guide a locking pin in at least one of the recesses of the locking disc in order to fix the absolute angular position of the locking bolt.

4. The device according to claim 3, wherein said locking disc is arranged between the support member and the control element and is fixed rotation-resistant to the shaft.

5. The device according to claim 3, wherein said locking device comprises an electromagnet for actuating the at least one locking bolt.

6. The device according to claim 2, wherein the drive device rotates the support member relative to the at least one locking bolt while the at least one locking bolt is fixed in the absolute position by means of the fixing device.

7. The device according to claim 1, wherein the drive device comprises:
an electric motor that is controllable as a function of an absolute angular position of the Maltese cross transmission structure or as a function of an absolute angular position of the at least one locking bolt or a component coupled thereto; and
a drive structure for the support member, the drive structure driven by an electric motor and being in engagement with the Maltese cross transmission structure.

8. The device according to claim 7, wherein for detecting the absolute angular position of the Maltese cross transmission structure, the support member further comprises an annular cogwheel structure, which is in engagement with a sensor cogwheel for determining the absolute angular position.

9. The device according to claim 7, wherein the drive structure comprising:
a cogwheel structure comprising a first engagement member arranged on a front side of the cogwheel structure facing the Maltese cross transmission structure and a second engagement member arranged on an end face, wherein the first engagement member and the second engagement member upon rotation of the cogwheel structure alternately engage in the Maltese cross transmission structure to cause an intermittent rotation of the Maltese cross transmission structure; and
a screw rotatable by means of the electric motor and being in engagement with cogs disposed on the circumference of the cogwheel structure in order to bring the cogwheel structure to rotation by interaction between the screw and the cogs.

10. The device according to claim 2, wherein the device further comprises an angle detecting means configured to detect the absolute angular position of the at least one locking bolt or the shaft.

11. The device according to claim 1, wherein the control element comprises a rotary knob, and the at least one locking bolt is rotation-resistant coupled by the shaft to the rotary knob of the device.

12. The device according to claim 1, wherein the Maltese cross transmission structure is formed on a side of the support member that is facing away from the control element.

13. A motor vehicle with the device according to the claim 1, wherein the device is configured to select a desired gear out of a plurality of gears of the motor vehicle.

14. A method for selecting a desired switch position from a plurality of switch positions, the method comprising:
arranging a support member rotatable around a shaft relative to at least one locking bolt and a control element, wherein a snap-in cam is formed in the support member, and a Maltese cross transmission structure is formed in the support member, a gear position depending on a position of the at least one locking bolt relative to the snap-in cam; and
rotating the support member by a drive device that is in engagement with the Maltese cross transmission structure so that the support member with the snap-in cam rotates around the shaft relative to the at least one locking bolt depending on a desired switch position.

15. The device according to claim 1, wherein the snap-in cam is formed in an inner peripheral region of the support member.

16. The device according to claim 15, wherein detents of the snap-in cam correspond to the plurality of switch positions, and at least one detent is located in an axially lower position than the rest of the detents.

17. The device according to claim 7, wherein the drive structure comprises a screw driven by the electric motor, the screw driving an annular cogwheel structure of the support member.

18. The device according to claim 9, wherein the cogwheel structure and the Maltese cross transmission structure are formed concentric to each other and rotationally symmetric.

19. The device according to claim 9, wherein the Maltese cross transmission structure further comprises:
- radial slots configured to engage with the first engagement member; and
- circular segment locks configured to engage with the second engagement member, the radial slots and circuit segment locks alternately arranged on a side of the Maltese cross transmission structure.

20. A device for selecting a desired switch position out of a plurality of switch positions, said device comprising:
- a control element;
- a support member arranged axially below the control element, the support member configured to rotate around a shaft, relative to at least one locking bolt and the control element, wherein a snap-in cam is formed in the support member forming a Maltese cross transmission structure, and a switch position depends on a position of the at least one locking bolt relative to the snap-in cam;
- a drive device rotating the support member via an engagement with the Maltese cross transmission structure; and
- a fixing device comprising a locking disc rotationally coupled to the at least one locking bolt by which an absolute angular position of the at least one locking bolt is fixed while the drive device rotates the Maltese cross transmission structure.

* * * * *